United States Patent [19]

Amtmann

[11] Patent Number: 4,931,643
[45] Date of Patent: Jun. 5, 1990

[54] AUTORADIOGRAPHY SYSTEM FOR STIMULABLE PHOSPHOR FOILS

[75] Inventor: Heribert Amtmann, Langensendelbach, Fed. Rep. of Germany

[73] Assignee: Siemens Aktiengesellschaft, Berlin and Munich

[21] Appl. No.: 262,944

[22] Filed: Oct. 24, 1988

[30] Foreign Application Priority Data

Nov. 17, 1987 [DE] Fed. Rep. of Germany ....... 3739010

[51] Int. Cl.$^5$ ............................................. G01N 23/04
[52] U.S. Cl. ................................ 250/327.2; 250/484.1
[58] Field of Search ................. 250/327.2, 385.1, 484.1

[56] References Cited

U.S. PATENT DOCUMENTS

| | | | |
|---|---|---|---|
| 4,686,368 | 8/1987 | Anderson et al. | 250/385.1 |
| 4,734,581 | 3/1988 | Hashive | 250/327.2 |

FOREIGN PATENT DOCUMENTS

| | | | |
|---|---|---|---|
| 0112469 | 7/1984 | European Pat. Off. | |
| 0137453 | 4/1985 | European Pat. Off. | |
| 0159523 | 10/1985 | European Pat. Off. | 250/327.2 |

OTHER PUBLICATIONS

"Color Photographs of The Night Sky are Made By Refrigerating The Film," Scientific American, vol. 221, No. 2, Aug. 1969, pp. 125–129.

"Product Review," Nature, vol. 326, Apr. 16, 1987, p. 725.

*Primary Examiner*—Carolyn E. Fields
*Assistant Examiner*—David P. Porta
*Attorney, Agent, or Firm*—Hill, Van Santen, Steadman & Simpson

[57] ABSTRACT

An autoradiography system for obtaining exposures from, and reading the latent image stored in, stimulable phosphor foils includes a cassette which receives a preparation of low energy radiation emitting tissue to be examined and two stimulable phosphor foils separated by a shielding plate consisting of material permeable to high energy radiation, but impermeable to low energy radiation. The cassette is surrounded by a high radiation absorbing housing. The preparation is disposed against one of the foils, so that the low energy radiation therefrom forms a latent image on the adjacent foil, but cannot pass through the shielding plate to form an image on the other foil. Both foils will, however, record and form a latent image of high energy radiation which may not be absorbed by the cassette housing. One of the foils thus exhibits a latent image due solely to background or thermal radiation, while the other phosphor foil has a latent image corresponding to the tissue, as well as the background and thermal radiation. A processing circuit is included in a read out system having a subtraction stage which subtracts electronic signals corresponding to the two latent images from each other, so that a tissure image free of background and thermal radiation noise is obtained. Insensitivity to thermal noise is obtained by insulating and cooling the cassette.

10 Claims, 2 Drawing Sheets

AUTORADIOGRAPHY SYSTEM FOR STIMULABLE PHOSPHOR FOILS

BACKGROUND OF THE INVENTION

1. Field of the Invention

The present invention is directed to an autoradiography system for exposing, storing and reading out a latent image of a tissue preparation made self-stimulable.

2. Description of the Prior Art

Autoradiography systems are known which include a cassette which receives a preparation of tissue to be examined made self-radiating by a suitable radioisotope, and a phosphor foil which records radiation from the tissue sample. After exposure to the preparation, the latent image in the phosphor foil is read out by a suitable scanning beam, and the resulting light is detected and electronic signals generated therefrom, from which a visual image is obtained.

The tissue preparation may be made, for example, from bone cells or carcinoma cells, and the preparation made therefrom is brought into direct contact with the phosphor foil.

A filmless autoradiography system is described in the periodical "Nature" Volume 326, Apr. 16, 1987 at page 725. In this system, the replacement of conventional x-ray film with a stimulable phosphor foil is disclosed. After exposure by the radiation-emitting preparation, the stimulable phosphor foil is scanned by a laser, so that the phosphor foil emits light corresponding to the latent image stored therein. The emitted light is acquired by a detector, the output signal of which is converted into a digital signal which is supplied to a computer for storage, analysis and processing. A visible image can be viewed on a monitor. Because such stimulable phosphor foils are more sensitive than conventional x-ray film at the radiation levels occurring in autoradiography, the stimulable phosphor foil is thus also exposed to scattered radiation produced by cosmic rays, in addition to being exposed to the useful radiation of the tissue preparation. Such exposure to cosmic rays occurs predominately during the time the foil is being exposed to the tissue preparation. The disturbances caused by the cosmic ray appear in the resulting image as pronounced point patterns, and thus limit the sensitivity of the system. Given longer exposure times, a further source of noise occurs, namely the thermal noise of the stimulable phosphor itself, so that the image quality may be further deteriorated.

SUMMARY OF THE INVENTION

It is an object of the present invention to provide an autoradiography system using a phosphor foil as the radiation-recording element which is substantially insensitive to image disturbances caused by cosmic radiation and thermal noise.

The above object is achieved in accordance with the principles of the present invention in an autoradiography system having a cassette which receives two phosphor films, separated by a shielding plate which is impermeable to the relatively low energy radiation generated by the tissue sample. The tissue sample is disposed adjacent one of the foils, and the arrangement of the foils, the shielding plate and the tissue sample are placed in the cassette, which has a housing substantially impermeable to high energy radiation, such as cosmic rays. It is unavoidable, however, that a small amount of cosmic radiation will nonetheless fail to be absorbed by the housing. Such cosmic radiation will, however, be recorded by both phosphor foils, since such high energy radiation will not be absorbed by the shielding plate between the foils. The foil against which the tissue preparation is adjacent will store a latent image corresponding to the useful radiation emitted by the tissue preparation plus the background radiation caused by the cosmic rays. The other foil will store a latent image corresponding only to the cosmic ray background. A read-out unit for the foils includes a subtraction stage, so that the electronic signals formed corresponding to each of the latent images are subtracted from each other, resulting in an image substantially free of background noise.

The autoradiography system substantially eliminates noise by the use of thermal insulation surrounding the cassette. The disturbing influences due to such thermal noise can be further reduced by providing a refrigeration unit for the cassette as a part of the autoradiography system.

Good shielding of the tissue preparation from the phosphor foil which is intended to record only background radiation is achieved in an embodiment wherein the shielding plate consists of lead or other known shielding material and is 0.5 mm or less in thickness. As used herein, therefore, "high energy radiation" means radiation which will pass through such a shielding plate, and "low energy radiation" means radiation which will not pass through such a plate.

Most cosmic radiation can be prevented from reaching the interior of the cassette at all in an embodiment wherein the housing consists of lead having a thickness in the range of about 1 through about 2 mm.

In a further embodiment, the cassette is provided with a pressure applying structure to hold the preparation, the two phosphor foils and the shielding plate in tight adjacency against the interior walls of the cassette.

DESCRIPTION OF THE PREFERRED EMBODIMENTS

Figure 1:
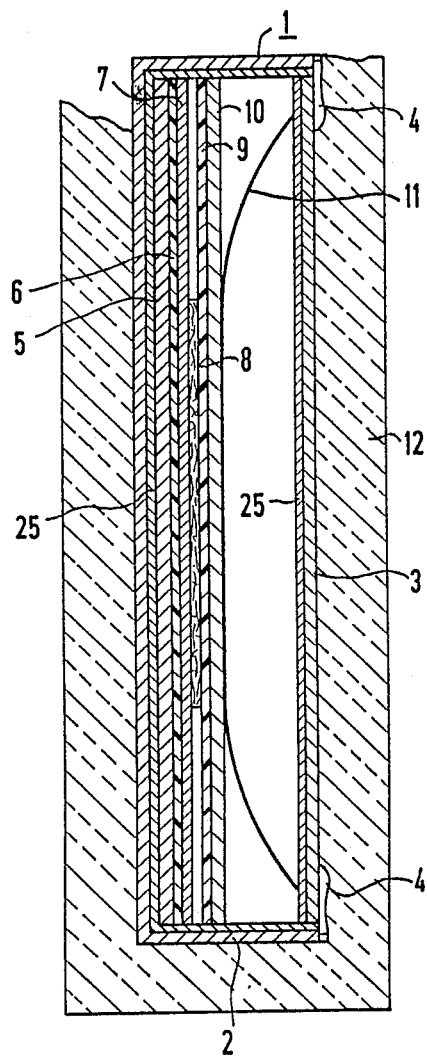
FIG. 1 is a side sectional view of a cassette for an autoradiography system constructed in accordance with the principles of the present invention.
Figure 2:
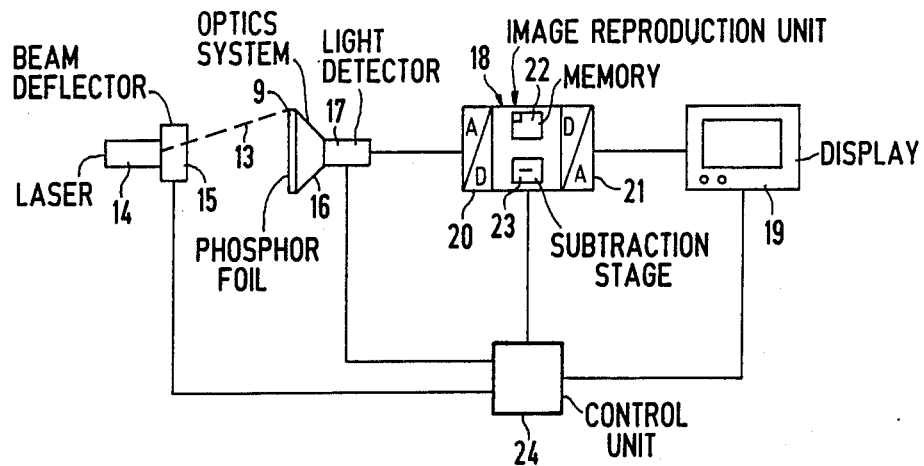
FIG. 2 is a schematic block diagram of a read-out system for an autoradiography system constructed in accordance with the principles of the present invention.

A cassette 1 for use in a autoradiography system constructed in accordance with the principles of the present invention is shown in section in FIG. 1. The cassette 1 includes a housing 2 which can be closed by a cover 3 by a closing mechanism 4. The housing 2 and the cover 3 of the cassette 1 form a shielding 25 which may, for example, consist of lead of 1 through 2 mm in thickness. A first pressure plate 5, on which a first stimulable phosphor foil 6 is disposed, is received in the cassette 1 against an interior wall of the housing 2. The first stimulable phosphor foil 6 is covered by a shielding plate 7 which, for example, may consist of 0.5 mm thick lead. The shielding plate 7 is followed in sequence by a tissue preparation 8 and a second stimulable phosphor foil 9. A second pressure plate 10 forces the arrangement between the plate 10 and the plate 5 together in combination with a spring 11 supported against the cover 3 of the cassette 1. The cassette 1 is externally surrounded by a thermal insulation 12 consisting, for example, of Styropor ®.

During an exposure, the tissue preparation 8, which has been made low radiation-emitting, is introduced into the cassette 1, so that the radiation emitted by the preparation 8 is absorbed in the phosphor layer of the second stimulable phosphor foil 9 so that holes are generated in the phosphor layer. The holes are retained in potential wells of the phosphor, so that the radiation pattern emitted by the preparation 8 remains stored in the phosphor foil 9 as a latent image. The number of holes in the image depends upon the amount of absorbing radiation energy. The radiation emitted by the preparation 8, being low energy radiation, cannot penetrate the shielding plate 7, so that the fist stimulable phosphor foil 6 is not exposed by the preparation 8. Any high energy radiation which may permeate the housing 2 will, however, expose both stimulable phosphor foils 6 and 9.

The material of the shielding plate 7 can be selected on the basis of suitable combinations so as to be substantially impermeable to the radiation of the preparation 8 in comparison to the permeability to cosmic radiation. The thickness and composition of the shielding plate 7 will depend upon the energy of the radiation from the preparation 8.

For reproduction of the latently stored image, both stimulable phosphor foils 6 and 9 are separately scanned pixel-by-pixel by a laser beam 13 generated by a laser 14 which is swept across the surface of the stimulable phosphor 9 (or 6) by a beam deflector 15. The beam deflector 15 may, for example, be a combination of a deflection mirror for the vertical sweep and an electro-optical beam deflector for the horizontal sweep. Due to the scanning with the laser beam 13, all pixels in the stimulable phosphor foil 9 (or 6) are successively excited so that the holes are given sufficient energy to escape the potential wells, and subsequently fall back to their original energy level, emitting light. An optical system 16 collects the light thus emitted and directs the light to a detector 17 which measures the brightness of the scanned pixels and generates a corresponding analog electrical signal, which is supplied to an image reproduction unit 18. The image reproduction unit 18 converts the incoming signal to a digital signal in an analog-to-digital converter 20, and stores the digital signal in an image memory 22. Once the latent images, respectively converted into digital signals, are both stored in the memory 22, the stored images are supplied to a subtraction stage 23. The image obtained from the foil 6 is subtracted from the image obtained from the foil 9, so that a digital image substantially free of background noise is obtained. The digital image resulting from the subtraction is supplied to a digital-to-analog converter 21, the output of which is supplied to a display monitor 19 for visual display.

Figure 3:
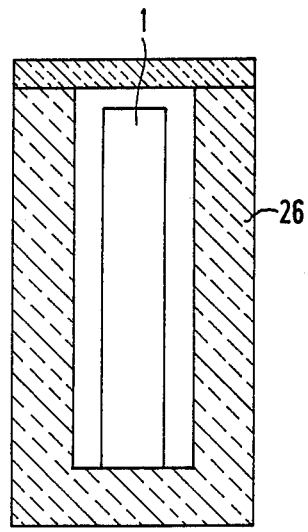
FIG. 3 is a side sectional view of a refrigeration unit containing a cassette as part of the autoradiography system constructed in accordance with the principles of the present invention.

For reducing thermal noise in the stimulable phosphor foils 6 and 9, the cassette 1 is cooled before introduction of the tissue preparation into the cassette 1 by placing the casette 1 in a refrigeration unit 26, as schematically indicated in FIG. 3. Due to the thermal insulation 12, the cassette 1 can remain outside of the refrigeration unit 26, for example during exposure to the preparation 8, for a sufficient time without heating to an undesirable degree such that thermal noise is produced in significant amount. Cooling of the cassette 1 is interrupted only for scanning the stimulable phosphor foils 6 and 9 with the laser beam 13.

The autoradiography system disclosed herein yields images of the preparation 8 which are essentially free of noise produced by cosmic radiation and thermal noise.

Although modifications and changes may be suggested by those skilled in the art it is the intention of the inventor to embody within the patent warranted hereon all changes and modifications as reasonably and properly come within the scope of his contribution to the art.

I claim as my invention:

1. An autoradiography system comprising:
    a cassette means for receiving a tissue preparation made low energy-radiation emitting, said cassette means having a housing consisting of material substantially impermeable to high energy radiation;
    a first stimulable phosphor foil disposed in said cassette means adjacent said preparation;
    a second stimulable phosphor foil disposed in said cassette means;
    a shielding plate disposed in said cassette means between said first and second stimulable phosphor foils, said shielding plate consisting of material permeable to high energy radiation but impermeable to low energy radiation so that said first stimulable phosphor foil stores a first latent image formed by high and low energy radiation and said second stimulable phosphor foil stores a second latent image formed only by high energy radiation;
    means for respectively reading-out said first and second latent images to form respective first and second image signals; and
    processing means for generating a visible image of said preparation from said first and second image signals including means for subtracting said second image signal from said first image signal.

2. An autoradiography system as claimed in claim 1, further comprising thermal insulation surrounding said housing of said cassette means.

3. An autoradiography system as claimed in claim 1 further comprising refrigeration means for receiving said cassette mean to cool said cassette means.

4. An autoradiography system as claimed in claim 1, wherein said shielding plate consists of lead.

5. An autoradiography system as claimed in claim 4, wherein said shielding plate has a thickness in the range of 0.5 mm or less.

6. An autoradiography system as claimed in claim 1, wherein said housing has a thickness in the range of about 1 through about 2 mm and consists of lead.

7. An autoradiography system as claimed in claim 1 further comprising pressure-applying means disposed in said housing of said cassette means for maintaining said first and second stimulable phosphor foils, said preparation, and said shielding plate in adjacent relation in said cassette means.

8. An autoradiography system as claimed in claim 7, wherein said pressure-applying means comprises at least one pressure plate and a spring disposed inside said housing of said cassette means and supported against said housing.

9. A method for operating an autoradiography system comprising the steps of:
    making a tissue preparation low energy-radiation emitting;

disposing said preparation in a cassette having a housing consisting of material substantially impermeable to high energy radiation;
disposing a first stimulable phosphor foil in said cassette adjacent said preparation;
disposing a second stimulable phosphor foil in said cassette;
shielding said second stimulable phosphor foil from said preparation by a shielding plate disposed in said cassette between said first and second stimulable phosphor foils, said shielding plate consisting of material permeable to high energy radiation but impermeable to low energy radiation;
exposing said first and second stimulable phosphor foils by storing a first latent image in said first stimulable phosphor foil formed by high and low energy radiation and storing a second latent image in said second stimulable phosphor foil formed only by high energy radiation;
respectively reading-out said first and second latent images and thereby forming respective first and second image signals;
subtracting said second image signal from said first image signal to obtain a subtraction result; and
generating a visible image of said preparation from said subtraction result.

10. A method as claimed in claim 9, comprising the additional step of:
applying pressure to said first and second stimulable phosphor foils, said shielding plate, and said preparation to maintain said first and second stimulable phosphor foils, said shielding plate and said preparation in tight adjacency in said cassette.

* * * * *